J. DANE, Jr.
Improvement in Egg Beaters.
No. 122,997.                                              Patented Jan. 23, 1872.
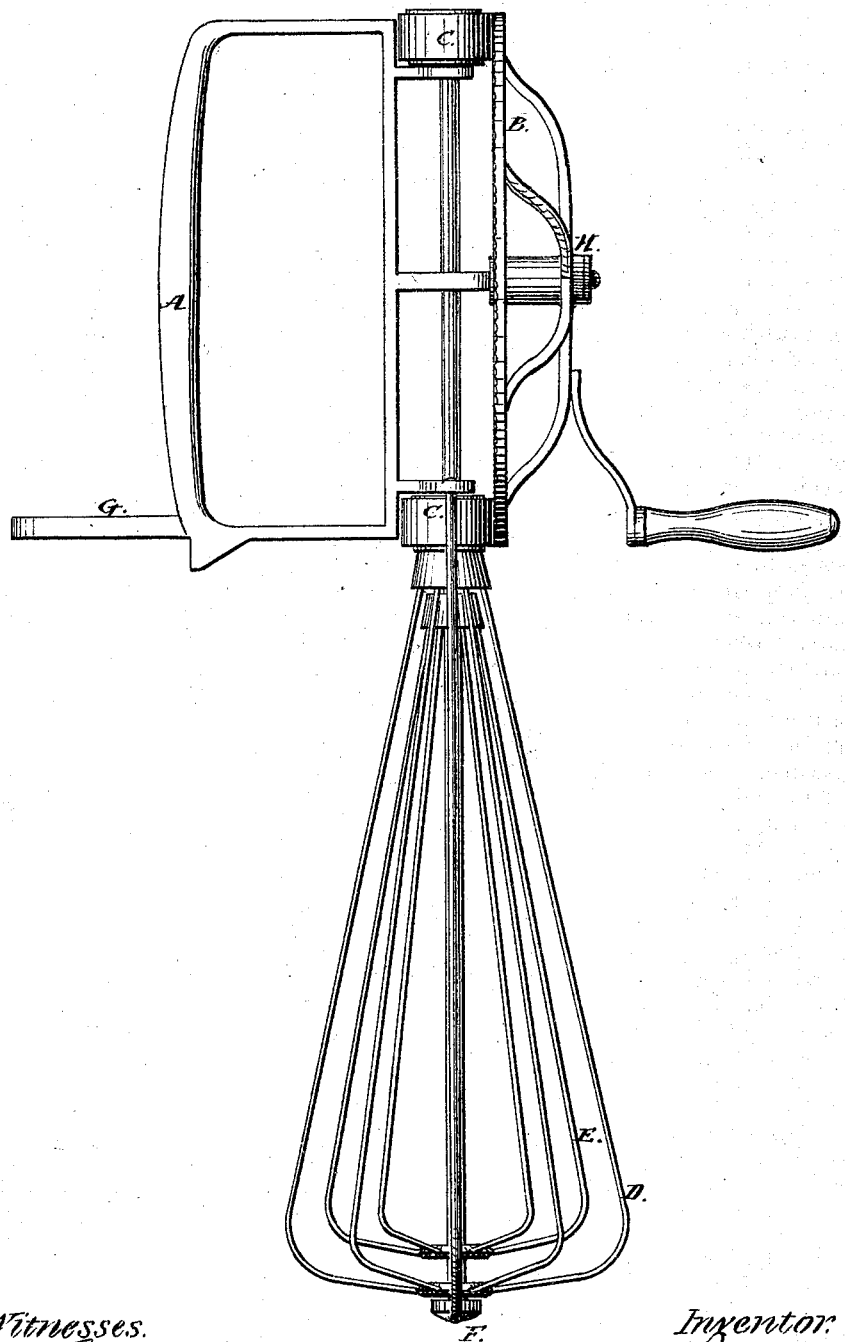

UNITED STATES PATENT OFFICE.

JOHN DANE, JR., OF NEWARK, NEW JERSEY, ASSIGNOR TO HIMSELF AND GEORGE W. KETCHAM, OF NEW YORK CITY.

IMPROVEMENT IN EGG-BEATERS.

Specification forming part of Letters Patent No. 122,997, dated January 23, 1872.

*To all whom it may concern:*

Be it known that I, JOHN DANE, Jr., of the city of Newark, county of Essex and State of New Jersey, have invented new and useful Improvements in the Manufacture of Egg-Beaters; and I do hereby declare that the same is described and represented in the following specifications and accompanying drawing.

Referring to the drawing, the figure represents my improved egg-beater.

Letter A represents the handle. Letter B represents the friction driving-wheel. Letters C C represent the friction-rolls. Letter D represents the beater. Letter E represents the inside beater. Letter F represents the guard. Letter G represents the projection to attach to table. Letter H represents the tension-spring.

To enable others skilled in the art to make my invention, I will describe its construction.

I make my improved egg-beater by using any suitable metals, rubber, &c. The frame or handle and wheel, for convenience and cheapness, may be cast. I prefer to make them of cast-iron. The beaters may be made of wire or of strips of tin; the guard also. The handle on the driving-wheel is made of the usual materials and in the usual manner. The face of the driving-wheel may be corrugated or depressed. I prefer, however, for convenience, to corrugate the face as shown, being more convenient to cast. The rolls may be cast of iron or made in molds by using molten lead, tin, or any similar material—usually made in a spool-form with flanges to better secure the rubber C C or similar materials fast in position. When made in the last manner no further labor is required to finish. The beaters are made from wire cut into suitable lengths, using generally from (4) four to (6) six pieces. Hubs are made from tin or lead by casting in molds. These have a hole through the center, also holes or depressions radially arranged from near the center hole to the outside. Into these depressions or holes the ends of the wires are placed, and are then soldered securely. This done, these wires are bent over a form to give the desired shape to the beater. After being thus formed it is ready to receive the hub at the opposite end or the top part of the beater. This hub is formed in a mold containing holes to insert the ends of the wires, which should pass into the mold sufficiently far to allow the metal to close around the ends of the wire and thus secure them. A spindle made of wire somewhat larger than used in the beaters is prepared of suitable length to extend through the beaters and the ears of the frame or handle and passing through the friction-roll at the top. I would add that the friction-roll is secured fast to the spindle at this point, which drives the inside beater, the inside beater being secured fast to the spindle. The outside beater revolves loosely upon the spindle, a friction-roll being securely attached to the hub of the same.

The guard F is formed the same as the beaters, although somewhat larger, to allow the beaters to revolve inside closely and without interference. I would add that a socket is prepared at the bottom of the guard for the end of the spindle to revolve upon or in. This guard is riveted to ears or perforations for that purpose on the frame or handle. The driving-wheel is drilled. The handle or crank is secured to its place and the wheel secured on the stem for the purpose by screw or pin, with a spring, H, between the hub of the wheel and screw to give an elastic pressure upon the face of the friction-rolls, which is of great assistance when the face of the wheel runs irregular, which is likely to occur when the driving-wheel is used without finishing by machinery.

To enable others to use my invention a brief explanation will suffice. The beater may be held in the hand or may be attached to a table by using a screw-clamp or screws to connect the projecting piece to the same. That the beater may be used with greater ease and convenience the wire part of the beater is placed into the vessel containing the eggs, when the beaters are made to revolve by turning the large wheel in the usual manner.

The object of my invention is to simplify and lessen the cost of such articles, and to construct the same in such a manner that the parts may be simple and not likely to get out of order.

I claim—

The combination of the spring H with the driving-wheel B and the elastic-faced wheels C C, constructed and operating substantially as and for the purpose specified.

JOHN DANE, JR.

Witnesses:
GABRIEL LEVERICH,
JOSEPH M. CRANE.